J. M. Howe.
Making Wagon Wheels.
Nº 48,687. Patented July 11, 1865.
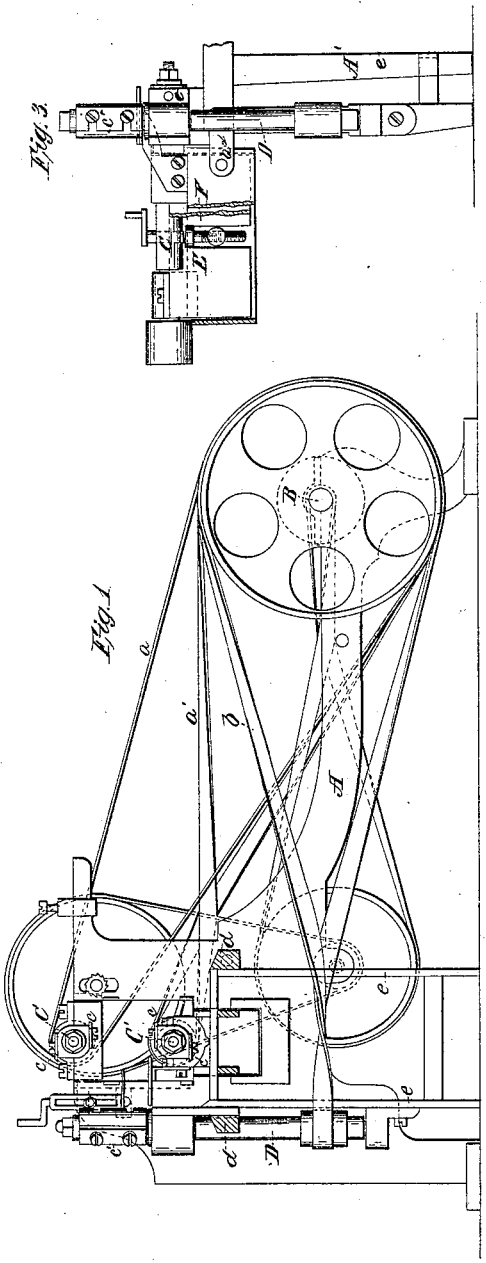

J. M. Howe,
Making Wagon Wheels.
No. 48,687.
Patented July 11, 1865.
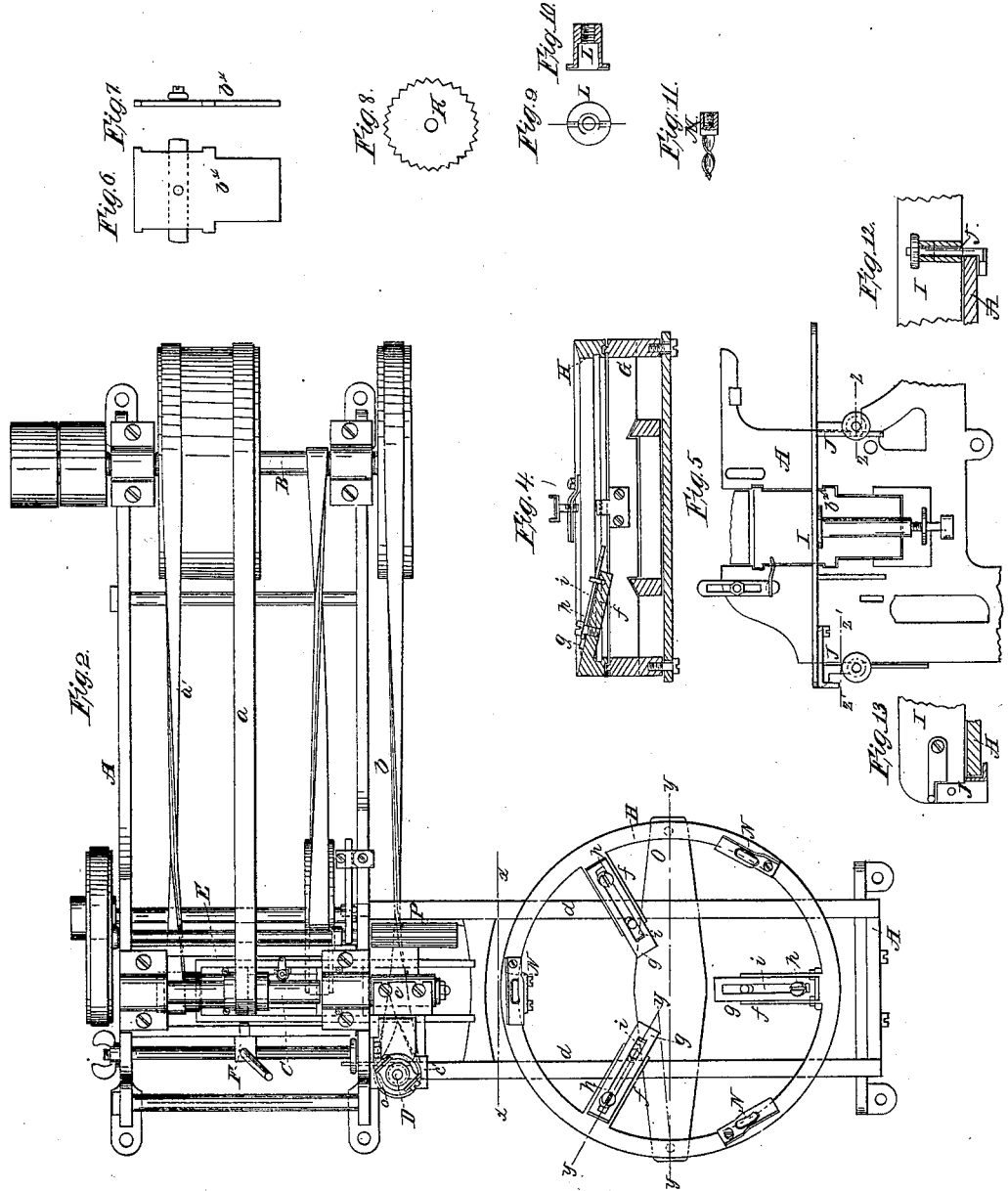
Witnesses
M. M. Livingston
Henry Morris
Inventor:
J. M. Howe
By Munn & Co

UNITED STATES PATENT OFFICE.

J. M. HOWE, OF PORTLAND, OREGON.

IMPROVEMENT IN MACHINES FOR MAKING WAGON-WHEELS.

Specification forming part of Letters Patent No. 48,687, dated July 11, 1865.

*To all whom it may concern:*

Be it known that I, J. M. HOWE, of Portland, in the county of Multnomah and State of Oregon, have invented a new and Improved Machine for Making Wheels for Vehicles and for Molding and Planing; and I do hereby declare that the following is a full, clear, and exact description thereof, which will enable others skilled in the art to make and use the same, reference being had to the accompanying drawings, making a part of this specification, in which—

Figure 1 represents a side sectional view of my invention, taken in the line $x\ x$, Fig. 2; Fig. 2, a plan or top view of the same; Fig. 3, a view of a portion of one end of the same; Fig. 4, a section of a portion of the same, taken in the line $y\ y$, Fig. 2; Fig. 5, a side view of a portion of the same when used as a planing-machine; Figs. 6, 7, 8, 9, 10, and 11, views of parts pertaining to the same; Figs. 12 and 13, sections of Fig. 5, taken respectively in the lines $z\ z\ z'\ z'$.

Similar letters of reference indicate like parts.

This invention relates to a new and useful machine for manufacturing parts of wheels for vehicles to—wit, boring the fellies, sawing them to the correct bevel, tenoning the spokes at both ends, sawing them to the required length, and planing the fellies simultaneously at three sides—and for planing and molding other articles or work.

A A' represents the framing of the machine, and B is a driving-shaft placed at one end of the same, from which two horizontal shafts, C C', are driven by belts $a\ a'$, and a vertical shaft, D, driven by a belt, $b$. The shafts C C' have each two cutters, $c\ c$, at one end, which act as planers, and similar cutters, $c'c'$, are at the upper end of the shaft D. These cutters are shown clearly in Figs. 1 and 2. The shaft C is placed in an adjustable frame, E, which may be raised and lowered by means of a screw, F, the shaft C', which is below C, having its bearings stationary. The relative position of the cutters of the three shafts C, C', D is shown clearly in Fig. 1. The bearings of the shaft D are stationary.

The part A' of the framing is composed of two parallel guides, $d\ d$, supported by standards $e$, said guides being in lines parallel with the shafts C C', and having upon them an annular slide, G, on which a ring, H, is fitted and allowed to turn freely. The ring H is provided with three arms, $f$, which project radially inward, and have each a slide, $g$, fitted on them and secured by set-screws $h$, which pass through oblong slots $i$ in the slides $g$, and admit of the latter being adjusted more or less inward, as may be desired. (See Fig. 2.)

I represents a table, (see Fig. 5,) provided with a pendent clamp, J, near each end, by which it is secured to the part A of the framing. The construction of these clamps and the manner in which they are applied to the part A and secure the table thereto will be fully understood by referring to Figs. 12 and 13. The part A' of the framing is detached from the part A when the table I is used, the part A' being secured to A by means of bolts or keys $a^\times$. (See Fig. 3.)

The operation is as follows: The tenons are first formed on the inner ends of the spokes, and are the tenons which are driven in the hub of the wheel. These tenons are formed by laying the spokes on a platform which rests on the guides $d\ d$, and then shoving the butts of the spokes between the cutters $c$ of the two shafts C C', the upper shaft, C, being adjusted to the proper height in order that the tenons may be cut of the desired thickness. The spokes are then driven in the hub and the latter centered in the ring H on the annular slide G, the slides $g$ being adjusted so as to firmly secure the hub in position, the slide G secured at the proper point on the guides $d\ d$, a circular saw, K, (see Fig. 8,) placed on the end of shaft C', and the ring H turned so that the saw K will cut the spokes all of the same length. The fellies are then cut at their ends to form a correct bevel to admit of them abutting snugly together. The saw K is now detached from the shaft C' and a hollow auger or bit, L, (see Figs. 9 and 10,) inserted in its place. By means of this auger or bit the tenons at the outer ends of the spokes are cut. The fellies of the wheel are then bored by a bit, M, secured to shaft C', and said fellies are then adjusted to the spokes, and the wheel secured in position by clamps N on the top of the ring H, said clamps grasping the spokes. The slide G is then adjusted in proper position on the guides $d\ d$, and secured by screwing up a bridge-tree, O, underneath the guides. The ring H is then turned, and the cutters of the two shafts C C' plane the two sides of the fellies, while the cutters of the shaft D cut or plane the outer edges of the same.

A feed-roller, P, may be employed for turning the wheel when the fellies are being planed.

The table I is designed to be employed when the machine is required for ordinary molding and planing. The space in the side of the part A of the framing is filled by a plate, $b^\times$, when I is used. (See Fig. 5.)

I claim as new and desire to secure by Letters Patent—

The annular slide G, with the ring H attached, and the latter provided with the arms $f$ and the slides $g$, in connection with the shafts C, C', and D, provided with cutters $c$ and $c'$, all arranged substantially as and for the purpose herein set forth.

J. M. HOWE.

Witnesses:
J. KAUFMAN,
LEVI ANDERSON.